(12) United States Patent
Louis-Seize

(10) Patent No.: US 8,353,249 B2
(45) Date of Patent: Jan. 15, 2013

(54) SEED DEPOSITING DEVICE AND METHOD FOR DEPOSITING SEEDS

(76) Inventor: Gerald W. Louis-Seize, Rockland (CA)

( * ) Notice: Subject to any disclaimer, the term of this patent is extended or adjusted under 35 U.S.C. 154(b) by 312 days.

(21) Appl. No.: 12/656,181

(22) Filed: Jan. 20, 2010

(65) Prior Publication Data

US 2010/0294183 A1    Nov. 25, 2010

(30) Foreign Application Priority Data

May 21, 2009    (CA) ..................................... 2667661

(51) Int. Cl.
*A01C 5/02*    (2006.01)
*A01C 7/18*    (2006.01)

(52) U.S. Cl. ............................................ 111/90; 111/92

(58) Field of Classification Search ............ 111/89–106, 111/112–116, 200, 900, 919
See application file for complete search history.

(56) References Cited

U.S. PATENT DOCUMENTS

| | | | | |
|---|---|---|---|---|
| 3,517,629 A | * | 6/1970 | James et al. | 111/96 |
| 3,848,772 A | * | 11/1974 | Aanestad et al. | 222/617 |
| 4,413,440 A | * | 11/1983 | Schultz | 43/124 |
| 4,624,194 A | * | 11/1986 | Zinck | 111/7.2 |
| 4,637,328 A | * | 1/1987 | Topham et al. | 111/89 |
| 4,760,807 A | * | 8/1988 | Keller | 111/92 |
| 5,101,744 A | * | 4/1992 | Nolan | 111/95 |
| 5,170,729 A | * | 12/1992 | Benner | 111/7.2 |
| 6,142,084 A | * | 11/2000 | Hatlø | 111/127 |
| 6,659,027 B1 | * | 12/2003 | Garcia | 111/95 |

OTHER PUBLICATIONS

Product packaging, front and back, for The Pro-Seeder ("Professional Seeder") dated at least as early as May 21, 2009, by Tenax Corporation, MD.
Tenax Retail & Construction Catalog, 2007, p. 7, cover and back pages, for Pro-Seeder at www.tenaxus.com/literature.
Product packaging, front and back, for Seed Spoons dated at least as early as May 21, 2009.
Product literature, 2 pages, for Seedmaster SM2 ("Seedmaster II") dated at least as early as May 21, 2009.
Manual, 5 pages, for Precision Garden Seeder, EarthWay 1001-B, by EarthWay Products Inc. dated at least as early as May 21, 2009.

* cited by examiner

*Primary Examiner* — Christopher J. Novosad

(57) ABSTRACT

A seed depositing device designed to facilitate the uniform distribution of seeds during planting applications. The device includes a tubular outer shell having an open end and at least one opening along its length. An inner core is concentrically located in the outer shell and has at least one row of dimples along the length of an outer surface of the inner core for holding seeds. The inner core fits tightly enough in the outer shell to disallow free movement of the inner core within the outer shell. Rotation structure is provided for manually rotating the inner core relative to the outer shell. The inner core is rotatable by the rotation structure to align the at least one row of dimples with the at least one opening and expose the at least one row of dimples through the at least one opening. When the inner core is rotated so the openings of the outer shell are aligned with a row of dimples of the inner core, seeds are manually loaded into the exposed row of dimples through the openings of the outer shell. Each row of dimples is successively loaded in like manner until all dimples are loaded with seeds. A reversal of these steps is used to deposit the seeds onto a predetermined area.

6 Claims, 4 Drawing Sheets

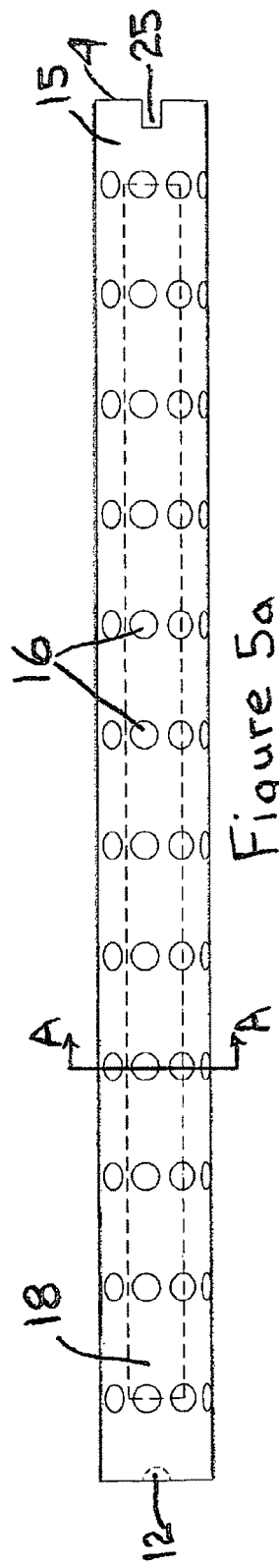
Figure 5a
Figure 5b
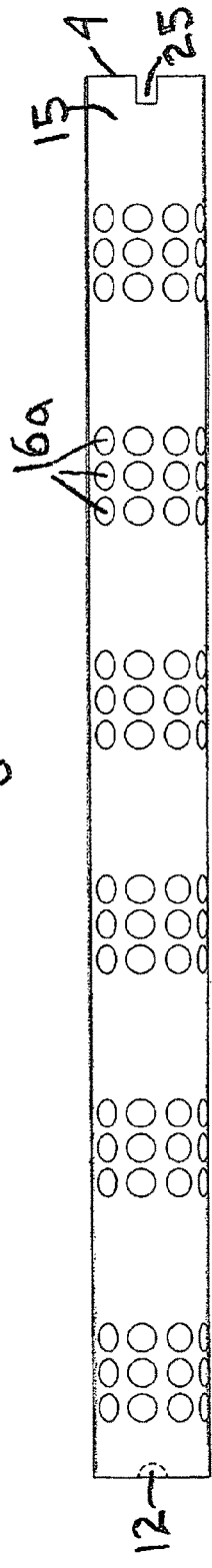
Figure 6
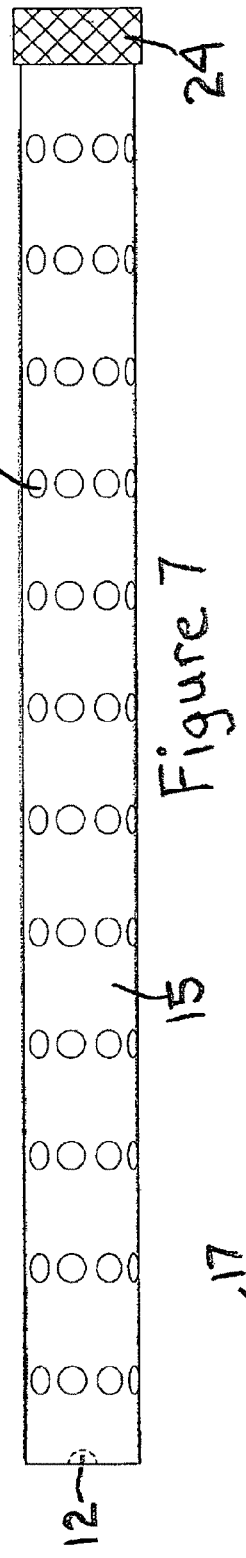
Figure 7

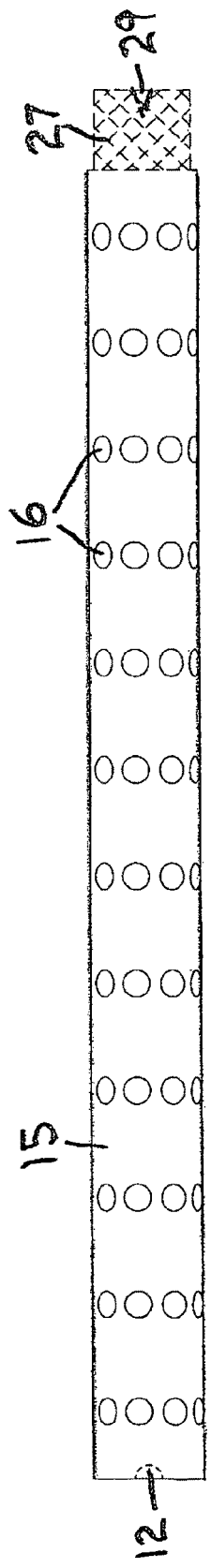
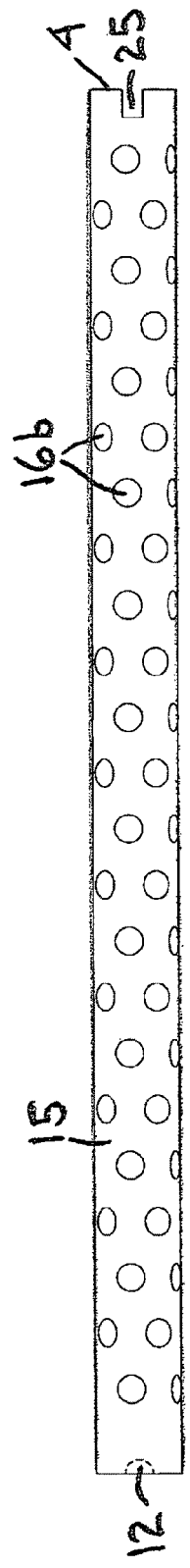
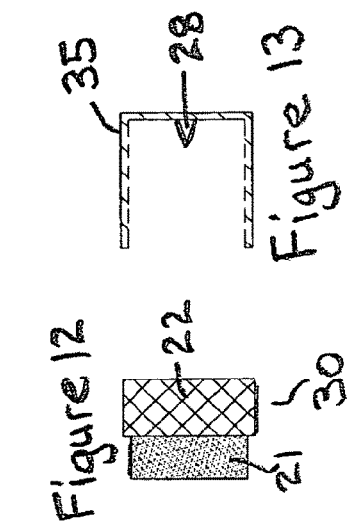
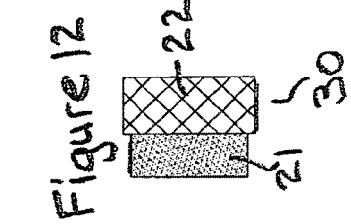
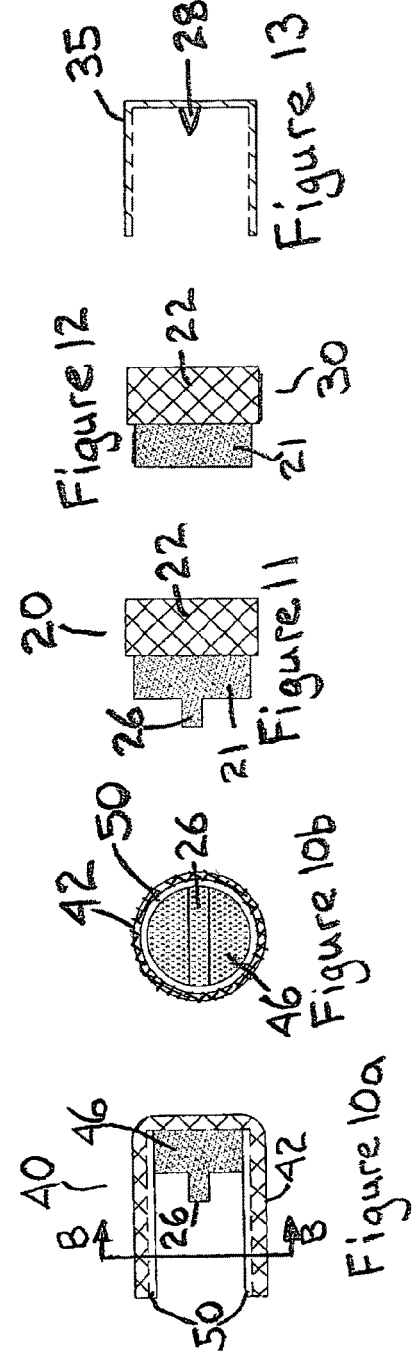

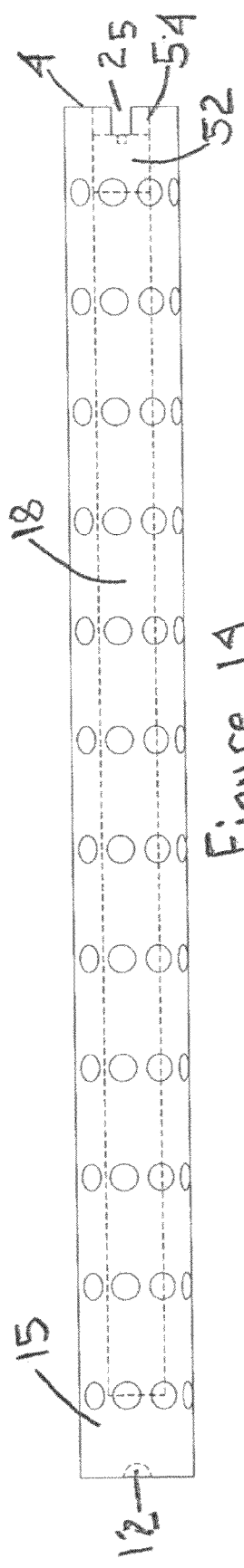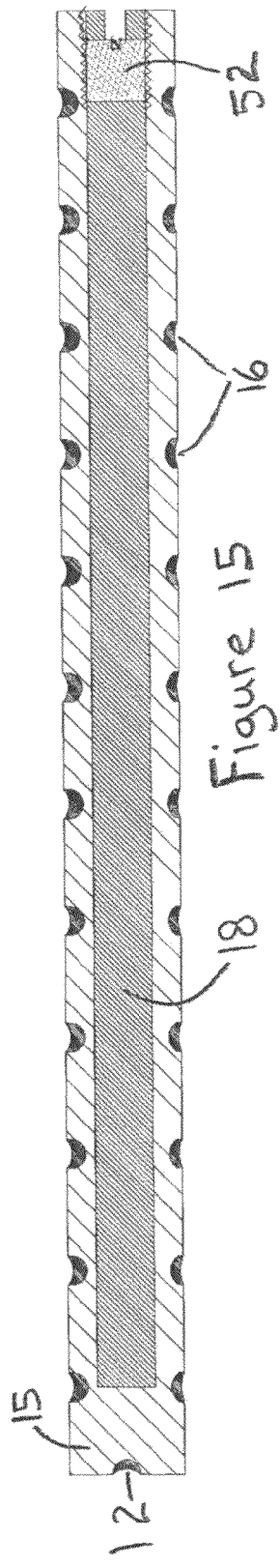
Figure 14
Figure 15
Figure 16
Figure 17

SEED DEPOSITING DEVICE AND METHOD FOR DEPOSITING SEEDS

FIELD OF INVENTION

A seed depositing device is provided for use in the field of horticulture, for facilitating the handling and planting of seeds.

BACKGROUND OF THE INVENTION

Many people are increasingly concerned about the state of the environment and the nutritional value of foods produced by big agri-business. As part of this awareness and in an effort to make the environment a better place to live, many of these people are switching to organic and local food. Gardening has gained in popularity as a result. This horticultural invention was designed to facilitate one area of the gardening process that can cause much frustration to both the busy urban backyard gardener and the horticulturalist working in small private and commercial nurseries—the handling, deposition and planting of seeds, especially small seeds.

Working with seeds, many types of which are small and difficult to handle, can be an arduous task. Seeds can be difficult to manipulate and it can be strenuous on a gardener's body to spread them evenly along a furrow in a garden bed or distribute them evenly in soil flats. The challenge of planting seeds outdoors can be compounded by high winds, heat, rain and pests such as mosquitoes and black flies can further impede a gardener's work.

Hand-held devices available in the marketplace, such as those provided under the trademarks "Professional Seeder", "Seed Spoon®", and "Seedmaster II®", are being marketed to aid in the handling, deposition and planting of seeds but improvements to those devices are needed in order to overcome disadvantages associated with their use and/or handling. The seed depositing device of the present invention provides such an improvement by its ease of use, effectiveness and robust, simple design.

SUMMARY

In accordance with the invention a combination for assembly of a seed depositing device, seed depositing device and method for depositing seeds in a seed planting application are claimed. The claimed combination includes a tubular outer shell having an open end and at least one opening along its length. An inner core is configured to be concentrically positioned in the outer shell with a fit resistant to rotation in the outer shell, and having at least one row of dimples along the length of an outer surface of the inner core for holding seeds. Also included is rotation means for manually rotating the inner core relative to the outer shell when the inner core is concentrically positioned in the outer shell, wherein the inner core is rotatable by the rotation means when the inner core is concentrically positioned in the outer shell to align the at least one row of dimples with the at least one opening and expose the at least one row of dimples through the at least one opening.

BRIEF DESCRIPTION OF THE DRAWINGS

Embodiments of the invention are described in the following with reference to the following drawings in which like reference numerals refer to like elements throughout.

FIG. 5a is a side view of an exemplary inner core of the seed depositing device of FIG. 1, having multiple rows of equally spaced dimples.

FIG. 5b is a sectional view of the inner core of FIG. 5a taken along line A-A.

FIG. 6 is a side view of a further exemplary inner core having multiple rows of equally spaced sets of dimples.

FIG. 7 is a side view of a still further exemplary inner core with a fixed cap.

FIG. 8 is a side view of a still further exemplary inner core having an extended core portion with a reduced diameter knob.

FIG. 9 is a side view of a still further exemplary inner core having multiple offset rows of equally spaced dimples.

FIG. 10a is a longitudinal sectional view of an exemplary dual purpose keycap in position over the open end of the seed depositing device but showing only that part of the end of the seed depositing device to which this dual purpose keycap is fitted.

FIG. 10b is a sectional view of the dual purpose keycap of FIG. 10a taken along line B-B.

FIG. 11 is a side view of an exemplary keycap.

FIG. 12 is a side view of an exemplary cap.

FIG. 13 is a side view of an exemplary cap configured for covering the extended core portion of the inner core shown in FIG. 8.

FIG. 14 is a side view of a further exemplary inner core of the seed depositing device which is similar to that shown by FIG. 5a but for which the hollow center extends through to one end of the inner core so as to provide an open end, and with a closure component included to close the open end.

FIG. 15 is a longitudinal sectional view of the inner core of FIG. 14 showing the hollow center and closure component closing the end.

FIG. 16 is a top view of the inner core and closure component of FIG. 14.

FIG. 17 is a side view of the closure component of FIGS. 14-16, shown in isolation.

DETAILED DESCRIPTION

Figure 1:
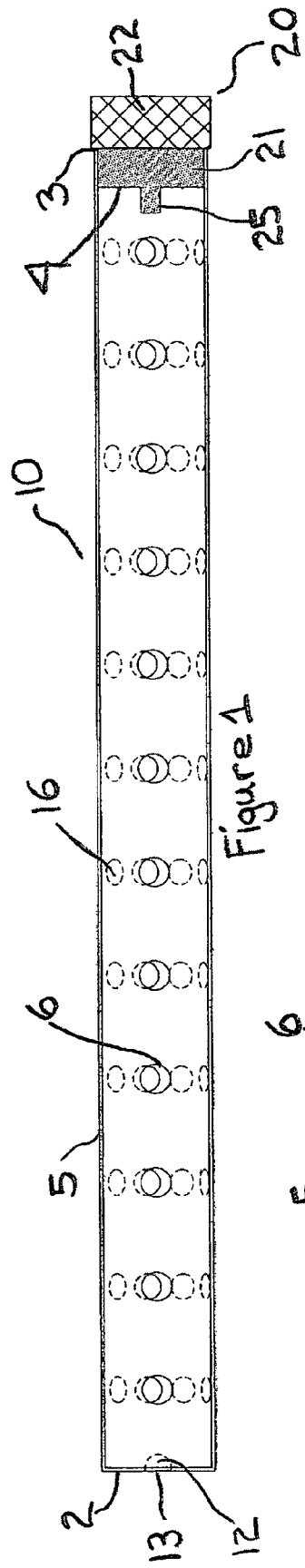
FIG. 1 is a side view of an exemplary seed depositing device in accordance with the invention, completely assembled and with a keycap in the open end.

The seed depositing device 10 of the invention may be embodied or provided in the form of an implement, tool or apparatus for use in depositing seeds in a seed planting application.

Preferred embodiments of a seed depositing device 10 in accordance with the invention are illustrated by the drawings. The device 10 is comprised of a tubular outer shell 5 having a single row of openings 6, 6a or 6b along its length, and a cylindrical inner core 15 fitted concentrically within the outer shell 5 and having rows of dimples 16, 16a or 16b along the length of an outer surface of the inner core 15 for holding seeds, whereby the dimples 16, 16a or 16b are alignable with corresponding openings 6, 6a or 6b by manually rotating the inner core 15 and outer shell 5 relative to one another. When so aligned, the dimples 16, 16a or 16b are exposed through corresponding openings 6, 6a or 6b and may be loaded with seeds or, if previously loaded with seeds, may deposit those seeds during the course of a seed planting application. The outer diameter of the inner core 15 is only slightly smaller than the inner diameter of the outer shell 5 so that they fit together, concentrically, with sufficient resistance to rotation that the inner core 15 does not freely move or rotate in the outer shell 5.

In a preferred embodiment in FIG. 1, the outer shell 5 of the seed depositing device 10 has one row of openings 6 along its length. The openings 6 are equally spaced to match any one of several rows of correspondingly spaced dimples 16 along the length of the outer surface of the inner core 15. In this particular embodiment, the outer shell 5 has a closed first end 2 and an open second end 3. The inner core 15 is manually rotated relative to the outer shell 5 by means of a keycap 20 shaped for insertion through the open end 3 of the outer shell 5 and fitting into a receiving portion 25, in the form of a groove, in a corresponding end 4 of the inner core 15.

Figure 2:
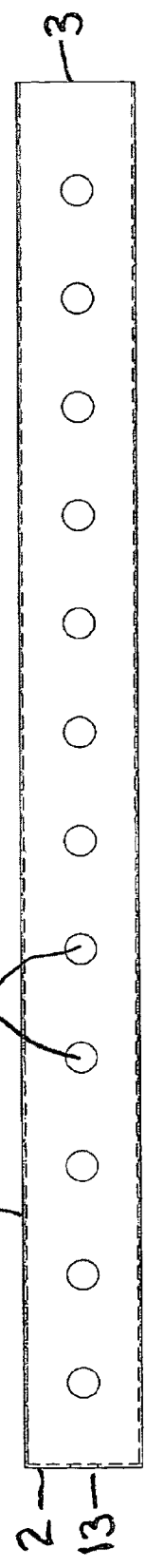
FIG. 2 is a side view of an exemplary outer shell of the seed depositing device of FIG. 1, having a single row of equally spaced openings.
Figure 3:
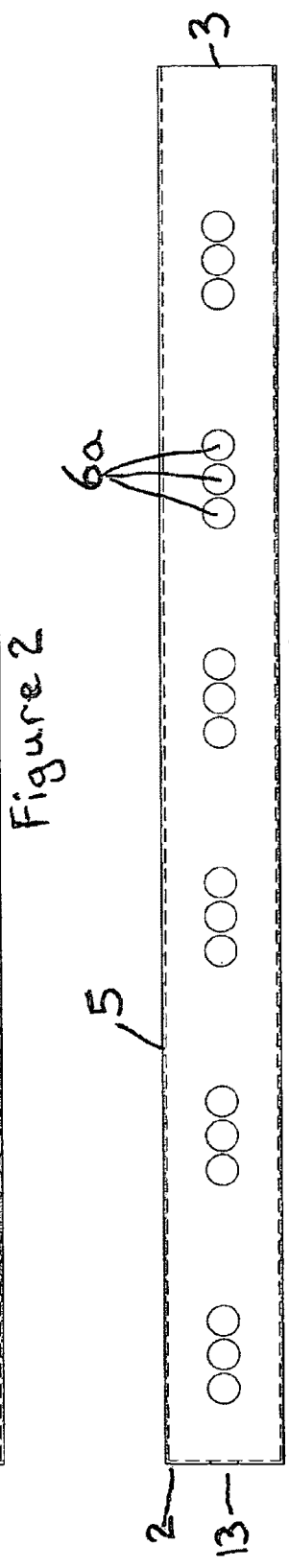
FIG. 3 is a side view of a further exemplary outer shell having a single row of equally spaced sets of openings.
Figure 4:
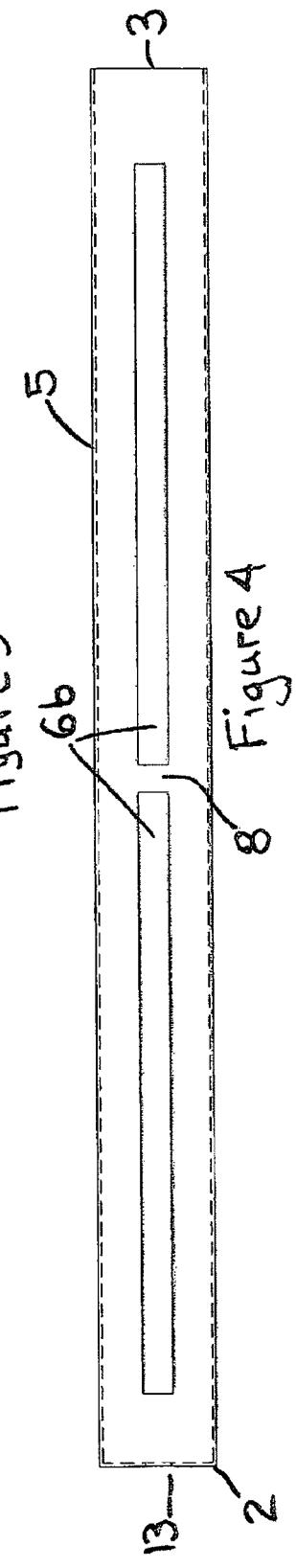
FIG. 4 is a side view of a still further exemplary outer shell having two slit openings, separated by a bridge.

FIG. 2 shows the outer shell 5 of FIG. 1 in isolation, having one row of equally spaced openings 6. FIGS. 3 and 4 show other, alternative arrangements of openings 6a and 6b, respectively, which might instead be used, as desired, for a given application. For instance, the outer shell 5 of FIG. 3 has a row of a spaced sets of openings 6a, to align with correspondingly shaped and arranged sets of dimples 16a (see FIG. 6). And, for example, the outer shell 5 of FIG. 4 has a row of slit openings 6b which are shaped and positioned to align with a row of dimples 16, 16a or 16b by rotating the outer shell 5 and inner core 15 relative to one another. A bridge 8 between the slit openings 6b is preferred to be included to strengthen the outer shell 5.

The outer shell 5 has an open end 3 for inserting the inner core 15 into the outer shell 5. The opposite end 2 of the outer shell 5 is closed in the illustrated embodiments, in which the closed end 2 includes a hole 13 which may be used to facilitate the removal of the inner core 15 from within the outer shell 5.

In the illustrated embodiments the outer shell 5 is transparent. This enables the user to see the dimples in the inner core 15 below it and may make it easier for the user to align the openings in the outer shell 5 over the dimples on rotation of the inner core 15.

FIGS. 5a and 5b illustrate the inner core 15 of the seed depositing device 10 of FIG. 1 in isolation. Adjacent rows of equally spaced dimples 16 are positioned along the length of an outer surface of the inner core 15. As stated, alternative dimple arrangements, such as the sets of dimples 16a shown in FIG. 6 may alternatively be used with a correspondingly configured outer shell 5, as desired, depending upon the intended planting application.

The inner core 15 may be a solid piece or, alternatively, to reduce material costs and weight, may have a hollow center 18. A cross-section taken along line A-A of FIG. 5a is shown in FIG. 5b. The dimples 16 are depressions on the outer surface of the inner core 15 that do not penetrate to the hollow center 18. The size, depth and spacing of the dimples can vary to accommodate different size seeds and/or having different desired spacing when planting. The outer surface of the inner core 15 includes a dimple-free portion 17 which is at least as wide as the openings 6 (or openings 6a or slit openings 6b, as applicable), to provide a position where seeds will not be exposed and, so, are prevented from exiting the openings 6 of the outer shell 5 when the seed depositing device 10 is being transported or stored.

Optionally, to provide more rows of dimples in a given diameter of inner core 15 and/or to reduce the diameter of the seed depositing device 10 without sacrificing the number of dimples 16 available for seeding, the inner core 15 may have offset rows of dimples 16b, as shown in FIG. 9. This configuration of offset rows of dimples 16b is able to operate effectively in conjunction with an outer shell 5 having a row of slit openings 6b, as shown in FIG. 4.

As will be understood by the reader, various alternative configurations of dimples in the inner core 15 and openings in the outer shell 5 can be used depending on the type and size of the seed, the spacing required for the seed, and the preferences of the user, for a given application.

To operate the seed depositing device 10, the concentric inner core 15 must be able to rotate relative to the outer shell 5 when an appropriate rotational force is applied, so as to position one of the rows of dimples 16 of the inner core 15 into alignment with the openings 6 of the outer shell 5. There are many alternative means of achieving this rotation.

In one embodiment, for example, as illustrated in FIGS. 1 and 11, rotation of the inner core 15 is accomplished by means of a keycap 20 having an insertion portion 21 and a gripping portion 22. The insertion portion 21 is inserted through the open end 3 of the outer shell 5. The insertion portion 21 of the keycap 20 has a key portion 26 that fits into a receiving portion 25 in the inner core 15. In this example, the key portion 26 and receiving portion 25 function as a tongue-and-groove-type mating. This operates like a lock and key such that when the keycap 20 is inserted through the open end 3 of the outer shell 5 and the key portion 26 is fit into the receiving portion 25, the inner core 15 can be manually rotated by a user by turning the gripping portion 22 of the keycap 20.

As will be understood by the reader, many alternative configurations of caps and similar components may be used, as desired, to achieve relative rotation of the inner core 15 and outer shell 5. FIGS. 10a-13 illustrate exemplary embodiments of caps which may be used to rotate the inner core 15 or to prevent the inner core 15 from rotating during transportation or storage of the seed depositing device 10. For example, in an embodiment which employs a keycap 20 to rotate the inner core 15 when the seed depositing device 10 is in use, the keycap 20 could be replaced by a cap 30 as shown in FIG. 12 during transportation or storage of the seed depositing device 10. The cap 30 has an insertion portion 21 and a gripping portion 22, but no key portion 26, so in use the inner core 15 is not rotated when cap 30 is turned.

To avoid the need for two caps in the foregoing embodiment, which switches between use of a keycap 20 and a cap 30, for example, the embodiment of a dual purpose keycap 40 illustrated by FIGS. 10a and 10b may be used. The dual purpose keycap 40 has a channel 50 into which the open end 3 of the outer shell 5 is inserted. The dual purpose keycap 40 also has an insertion portion 46 with a key portion 26 that fits into the receiving portion 25 of the inner core 15. To engage the inner core 15, the dual purpose keycap 40 is pushed into the open end 3 of the outer shell 5 and rotated until the key portion 26 of the dual purpose keycap 40 is mated with the receiving portion 25 of the inner core 15. In this position the inner core 15 is rotated by gripping and turning an outer gripping portion 42 of the dual purpose keycap 40 to manually turn the dual purpose key cap 40. In use, this is done until the outer shell openings 6, 6a or 6b have become aligned with the inner core dimples 16, 16a or 16b. To disengage and close the device 10, the dual purpose keycap 40 is rotated until the openings 6, 6a or 6b are aligned with the dimple free row 17 of the inner core 15, and then the dual purpose keycap 40 is pulled outward from the open end 3 of the outer shell 5 until the key portion 26 of the dual purpose keycap 40 is disengaged from the receiving portion 25 of the inner core 15.

When disengaged, the dual purpose key cap 40 is, again, slightly rotated to locate it in a position where the key portion 26 will be prevented from accidentally re-engaging the receiving portion 25 of the inner core 15.

In a further exemplary embodiment shown by FIG. 8, the inner core 15 itself may be constructed to extend beyond the open end 3 of the outer shell 5, to enable the inner core 15 to be rotated by manually rotating an extended portion 27 of the inner core 15. Optionally, a cap 24 as shown by FIG. 7 could be attached to and/or extend from the inner core 15 for use in manually rotated the inner core 15. Additionally, an extension cap 35, as shown in FIG. 13, may be provided to lock the position of the inner core 15 with extended portion 27 when the seed depositing device 10 is being transported or stored, to prevent the inner core 15 from turning accidentally. The extension cap 35 is placed over the extended portion 27 and around the outer shell 5, with a pin 28 of the extension cap 35 fitting into a pin receiving portion 29 of the extended portion 27, and with the extension cap 35 configured to fit tightly over the outer shell 5 so as to resist rotation.

A further embodiment of the inner core 15 is shown by FIGS. 14-17 in which a hollow center 18 is extended to the end 4 of the inner core 15, so that the inner core end 4 corresponds to an open end 54 of the hollow center 18, and the hollow center 18 may be used to store seeds, if desired. In this embodiment the inner core 15 is configured to receive a closure component 52 to close the open end 54 and prevent seeds stored in the hollow center from escaping. In the illustrated embodiment, the inner core 15 is threaded in the wall of the hollow center 18 at the open end 54 to receive a closure component in the form of a screw-in plug 52. A slot 56 is provided in the top of the screw-in plug 52 for receiving a suitable tool to be used to screw in the plug 52.

The seed depositing device 10 is made of a non-flexible material such as hard plastic, wood, metal, plexiglass or fiberglass. A rigid plastic construction is preferred for its practicality and manufacturing cost. When plastic is used, the composition of the plastic should be of food grade if the seed depositing device 10 is intended to handle seeds for foods. It is preferable that the plastic be UV resistant if the seed depositing device 10 is intended for use in the outdoors, and recyclable, for safe environmental disposal.

Selectable components, as desired, may be color coded to assist in product identification and content referencing (for example, the inner core 15 and/or caps 20, 30 and 40).

The outer shell 5 is preferably a light colored, transparent plastic. This allows the user to see the seeds, yet also provides some protection for light sensitive seeds in the field or in storage. Alternatively, the outer shell 5 may be opaque, if desired, in order to better protect light sensitive seeds during longer storage periods for example. The inner core 15 and the caps 20, 30 and 40 are preferably made of a rigid opaque plastic for stability and durability.

The length and diameter of the seed depositing device 10 can be chosen to accommodate the particular application, as desired, to promote practical, cost effective seed depositing. For example, larger diameter devices 10 could have an inner core 15 with increased rows of dimples 16. Particularly in these larger diameter depositing devices 10, the inner core 15 preferably has a hollow center 18 to reduce the weight and production costs, and to be more environmentally friendly. The diameter, depth and spacing of the inner core dimples 16 may be varied to accept and distribute size-specific seeds. The longer the cylindrical seed depositing device 10, the more seeds can be loaded into the device 10, and, the wider the diameter of the device 10, the more rows of dimples 16 the device 10 can hold, thus increasing the seed coverage of the bedding area.

To assemble the device 10, the inner core 15 is inserted through the open end 3 of the outer shell 5. Optionally, the inner core 15 may have a depression 12 that aligns with the hole 13 of the closed end 2 of the outer shell 5, which may be used to provide further assistance to the user when removing the inner core 15 from the outer shell 5. Depending on the embodiment, and whether the seed depositing device 10 is in use or in storage, a suitable cap may be placed on the open end 3 of the outer shell 5, which then closes the unit.

To load the seed depositing device 10 of FIG. 1 with seeds, the inner core 15 is rotated through use of keycap 20 until a row of dimples 16 is aligned with the openings 6 of the outer shell 5 so as to expose that row of dimples 16. Seeds are selected and manually placed into the empty, exposed dimples 16. Once that row of dimples 16 is filled with seeds, as desired, the inner core 15 is again rotated until the next row of empty dimples 16 are aligned with the openings 6 of the outer shell 5 and, again, the empty, exposed dimples 16 are filled with seeds. This process is repeated until all of the rows of dimples 16 of the inner core 15 have been filled with seeds. The inner core 15 is then rotated until the dimple-free portion 17 of the inner core 15 is aligned with the openings 6 of the outer shell 5 in order to close the device. If the loaded seed depositing device 10 is to be stored, the openings 6 of the outer shell 5 should be positioned to rest at the dimple free area 17 of the inner core 15 and an appropriate storage cap (for example, such as cap 30) can be used.

To plant the seeds stored in the seed depositing device 10, the seeds are deposited into furrows of a garden bed or into cells of soil flats. This is done by holding the seed depositing device 10 with the row of openings 6 of the outer shell 5 facing away from the ground and rotating the inner core 15 to expose the seeds of a row of dimples 16 through the openings 6. Place the seed depositing device 10 just above a furrow in a garden plot or align the seed depositing device 10 over a specific area on a soil flat, as the case may be, and slowly turn the device 10 to deposit the row of seeds. Then, move the seed depositing device 10 to its next length along the furrow or planting area and repeat the foregoing steps until the device 10 is emptied or the desired seed coverage has been achieved. These steps can be completed with relatively little effort and in a relatively short time.

To clean the seed depositing device 10, first remove any cap that may be on the open end 3 of the outer shell 5. Insert a pin through the hole 13 of the outer shell 5 into the bottom depression 12 of the inner core 15 and push out the inner core 15 from the outer shell 5. Once the components of the seed depositing device 10 have been cleaned and dried, the inner core 15 is reinserted into the outer shell 5 and, if desired position a cap into or onto the open end 3 of the outer shell 5.

The embodiments described herein are exemplary only and it will be understood by the reader that other embodiments, and variations of those described herein, are possible without departing from the invention. The embodiments described here are not intended to limit the scope of the invention defined by the appended claims.

What is claimed is:

1. A seed depositing device comprising:
   a tubular outer shell having an open end and at least one opening along its length;
   an inner core concentrically located in the outer shell and having at least one row of dimples along the length of an outer surface of the inner core for holding seeds, wherein the fit of the inner core resists rotation of the inner core in the outer shell; and, rotation means for manually rotating the inner core relative to the outer shell;

wherein the inner core is rotatable by the rotation means to align the at least one row of dimples with the at least one opening and expose the at least one row of dimples through the at least one opening.

2. The seed depositing device of claim 1 wherein the rotation means is a keycap having a gripping portion and an insertion portion with a key portion, and configured to fit into the open end of the outer shell, and an end of the inner core corresponding to the open end of the outer shell includes a receiving portion configured to receive the key portion of the insertion portion when the keycap is inserted into the open end of the outer shell whereby the inner core is caused to rotate when the gripping portion is rotated.

3. The seed depositing device of claim 1 wherein the at least one opening is selected from a group consisting of a row of equally spaced openings and one or more slit openings and the inner core comprises a plurality of correspondingly spaced rows of dimples and a dimple-free portion which is at least as wide as the openings.

4. The seed depositing device of claim 1 wherein the rotation means is an extended portion of the inner core extending beyond the open end of the outer shell.

5. The seed depositing device of claim 1 wherein the inner core comprises an open end and a hollow center extending to the open end of the inner core, wherein the open end of the inner core is configured to receive a closure component to close the open end of the inner core.

6. The seed depositing device of claim 1 wherein the outer shell comprises a row of equally spaced sets of openings and the inner core comprises one or more rows of correspondingly spaced sets of dimples.

* * * * *